(12) United States Patent
Grundvig

(10) Patent No.: US 8,780,476 B2
(45) Date of Patent: Jul. 15, 2014

(54) SYSTEMS AND METHODS FOR CONTROLLED WEDGE SPACING IN A STORAGE DEVICE

(75) Inventor: Jeffrey P. Grundvig, Loveland, CO (US)

(73) Assignee: LSI Corporation, San Jose, CA (US)

( * ) Notice: Subject to any disclaimer, the term of this patent is extended or adjusted under 35 U.S.C. 154(b) by 305 days.

(21) Appl. No.: 13/242,983

(22) Filed: Sep. 23, 2011

(65) Prior Publication Data

US 2013/0077188 A1 Mar. 28, 2013

(51) Int. Cl.
*G11B 5/09* (2006.01)
(52) U.S. Cl.
USPC .................. 360/51; 360/25; 360/26; 360/31; 360/77.02
(58) Field of Classification Search
None
See application file for complete search history.

(56) References Cited

U.S. PATENT DOCUMENTS

| | | | |
|---|---|---|---|
| 3,973,182 A | 8/1976 | Kataoka | |
| 3,973,183 A | 8/1976 | Kataoka | |
| 4,024,571 A | 5/1977 | Dischert et al. | |
| 4,777,544 A | 10/1988 | Brown et al. | |
| 5,130,866 A | 7/1992 | Klaassen et al. | |
| 5,237,325 A | 8/1993 | Klein et al. | |
| 5,278,703 A | 1/1994 | Rub et al. | |
| 5,293,549 A * | 3/1994 | Ichikawa | 360/51 |
| 5,309,357 A | 5/1994 | Stark et al. | |
| 5,341,249 A | 8/1994 | Abbott et al. | |
| 5,377,058 A | 12/1994 | Good et al. | |
| 5,521,948 A | 5/1996 | Takeuchi | |
| 5,523,902 A | 6/1996 | Pederson | |
| 5,535,067 A * | 7/1996 | Rooke | 360/51 |
| 5,594,341 A | 1/1997 | Majidi-Ahy et al. | |
| 5,668,679 A | 9/1997 | Swearingen et al. | |
| 5,696,639 A | 12/1997 | Spurbeck et al. | |
| 5,781,129 A | 7/1998 | Schwartz et al. | |
| 5,787,125 A | 7/1998 | Mittel | |
| 5,798,885 A | 8/1998 | Saiki et al. | |
| 5,835,295 A | 11/1998 | Behrens | |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 12/663,319, filed Dec. 7, 2009, Ratnakar Aravind.

(Continued)

*Primary Examiner* — Dismery Mercedes
(74) *Attorney, Agent, or Firm* — Hamilton DeSanctis & Cha

(57) ABSTRACT

Various embodiments of the present invention provide systems and methods for data processing. For example, some embodiments of the present invention provide clock generation systems that include: a first clock multiplier circuit, a second clock multiplier circuit, a modulus accumulator circuit, and a data clock phase control circuit. The first clock multiplier circuit is operable to multiply a reference clock by a first multiplier to yield a first domain clock, and the second clock multiplier circuit is operable to multiply the reference clock by a second multiplier to yield a second domain clock. The modulus accumulator circuit is operable to yield a value indicating a fractional amount of the second domain clock that an edge of the second domain clock is offset from a trigger signal. The data clock phase control circuit is operable to phase shift the second domain clock by a phase amount corresponding to the fractional amount.

20 Claims, 5 Drawing Sheets

(56) References Cited

U.S. PATENT DOCUMENTS

| | | | |
|---|---|---|---|
| 5,844,920 A | 12/1998 | Zook et al. | |
| 5,852,524 A | 12/1998 | Glover et al. | |
| 5,892,632 A | 4/1999 | Behrens | |
| 5,955,783 A | 9/1999 | Ben-Efraim | |
| 5,970,104 A | 10/1999 | Zhong et al. | |
| 5,986,830 A | 11/1999 | Hein | |
| 5,987,562 A | 11/1999 | Glover | |
| 6,009,549 A | 12/1999 | Bliss et al. | |
| 6,023,383 A | 2/2000 | Glover et al. | |
| 6,069,583 A | 5/2000 | Silvestrin et al. | |
| 6,081,397 A | 6/2000 | Belser | |
| 6,111,712 A * | 8/2000 | Vishakhadatta et al. | 360/51 |
| 6,208,478 B1 | 3/2001 | Chiu et al. | |
| 6,226,139 B1 * | 5/2001 | Yada | 360/51 |
| 6,269,058 B1 | 7/2001 | Yamanoi et al. | |
| 6,278,591 B1 | 8/2001 | Chang | |
| 6,400,518 B1 | 6/2002 | Bhaumik et al. | |
| 6,404,829 B1 | 6/2002 | Sonu | |
| 6,411,452 B1 | 6/2002 | Cloke | |
| 6,441,661 B1 | 8/2002 | Aoki et al. | |
| 6,490,110 B2 | 12/2002 | Reed et al. | |
| 6,493,162 B1 | 12/2002 | Fredrickson | |
| 6,519,102 B1 | 2/2003 | Smith et al. | |
| 6,530,060 B1 | 3/2003 | Vis et al. | |
| 6,603,622 B1 | 8/2003 | Christiansen et al. | |
| 6,606,048 B1 | 8/2003 | Sutardja | |
| 6,633,447 B2 | 10/2003 | Franck et al. | |
| 6,646,822 B1 | 11/2003 | Tuttle et al. | |
| 6,657,802 B1 | 12/2003 | Ashley et al. | |
| 6,747,826 B2 * | 6/2004 | Ohta et al. | 360/51 |
| 6,775,529 B1 | 8/2004 | Roo | |
| 6,788,484 B2 | 9/2004 | Honma | |
| 6,813,108 B2 | 11/2004 | Annampedu et al. | |
| 6,816,328 B2 | 11/2004 | Rae | |
| 6,839,014 B2 | 1/2005 | Uda | |
| 6,856,183 B2 | 2/2005 | Annampedu | |
| 6,876,511 B2 | 4/2005 | Koyanagi | |
| 6,912,099 B2 | 6/2005 | Annampedu et al. | |
| 6,963,521 B2 | 11/2005 | Hayashi | |
| 6,999,257 B2 | 2/2006 | Takeo | |
| 6,999,264 B2 | 2/2006 | Ehrlich | |
| 7,002,761 B1 | 2/2006 | Sutardja et al. | |
| 7,002,767 B2 | 2/2006 | Annampedu et al. | |
| 7,038,875 B2 | 5/2006 | Lou et al. | |
| 7,054,088 B2 * | 5/2006 | Yamazaki et al. | 360/65 |
| 7,072,137 B2 | 7/2006 | Chiba | |
| 7,082,005 B2 | 7/2006 | Annampedu et al. | |
| 7,092,462 B2 | 8/2006 | Annampedu et al. | |
| 7,116,504 B1 | 10/2006 | Oberg | |
| 7,126,776 B1 | 10/2006 | Warren, Jr. et al. | |
| 7,136,250 B1 | 11/2006 | Wu et al. | |
| 7,154,689 B1 | 12/2006 | Shepherd et al. | |
| 7,167,328 B2 | 1/2007 | Annampedu et al. | |
| 7,180,693 B2 | 2/2007 | Annampedu et al. | |
| 7,187,739 B2 | 3/2007 | Ma | |
| 7,191,382 B2 | 3/2007 | James et al. | |
| 7,193,544 B1 | 3/2007 | Fitelson et al. | |
| 7,193,798 B2 | 3/2007 | Byrd et al. | |
| 7,199,959 B1 * | 4/2007 | Bryant | 360/51 |
| 7,199,961 B1 | 4/2007 | Wu et al. | |
| 7,203,013 B1 | 4/2007 | Han et al. | |
| 7,206,146 B2 | 4/2007 | Flynn et al. | |
| 7,230,789 B1 | 6/2007 | Brunnett et al. | |
| 7,248,425 B2 | 7/2007 | Byun et al. | |
| 7,253,984 B1 | 8/2007 | Patapoutian et al. | |
| 7,265,937 B1 | 9/2007 | Erden et al. | |
| 7,286,313 B2 | 10/2007 | Erden et al. | |
| 7,301,717 B1 | 11/2007 | Lee et al. | |
| 7,308,057 B1 | 12/2007 | Patapoutian | |
| 7,323,916 B1 | 1/2008 | Sidiropoulos et al. | |
| 7,339,861 B2 * | 3/2008 | Minamino et al. | 369/47.28 |
| 7,362,536 B1 | 4/2008 | Liu et al. | |
| 7,375,918 B1 | 5/2008 | Shepherd et al. | |
| 7,411,531 B2 | 8/2008 | Aziz et al. | |
| 7,418,069 B2 * | 8/2008 | Schmatz et al. | 375/355 |
| 7,420,498 B2 | 9/2008 | Barrenscheen | |
| 7,423,827 B2 | 9/2008 | Neville et al. | |
| 7,446,690 B2 | 11/2008 | Kao | |
| 7,499,238 B2 | 3/2009 | Annampedu | |
| 7,525,460 B1 | 4/2009 | Liu et al. | |
| 7,529,320 B2 | 5/2009 | Byrne et al. | |
| 7,558,177 B2 | 7/2009 | Ogura et al. | |
| 7,602,568 B1 | 10/2009 | Katchmart | |
| 7,616,395 B2 | 11/2009 | Yamamoto | |
| 7,620,101 B1 | 11/2009 | Jenkins | |
| 7,630,155 B2 | 12/2009 | Maruyama et al. | |
| 7,911,724 B2 * | 3/2011 | Buch et al. | 360/51 |
| 7,929,237 B2 * | 4/2011 | Grundvig et al. | 360/51 |
| 8,027,117 B1 * | 9/2011 | Sutardja et al. | 360/75 |
| 8,213,106 B1 * | 7/2012 | Guo et al. | 360/77.08 |
| 8,477,444 B1 * | 7/2013 | Zou et al. | 360/51 |
| 8,508,879 B1 * | 8/2013 | Zou et al. | 360/51 |
| 2002/0001151 A1 | 1/2002 | Lake | |
| 2002/0150179 A1 | 10/2002 | Leis et al. | |
| 2002/0176185 A1 | 11/2002 | Fayeulle et al. | |
| 2002/0181377 A1 | 12/2002 | Nagata et al. | |
| 2003/0090971 A1 | 5/2003 | Gushima et al. | |
| 2003/0095350 A1 | 5/2003 | Annampedu et al. | |
| 2004/0179460 A1 | 9/2004 | Furumiya et al. | |
| 2005/0046982 A1 | 3/2005 | Liu et al. | |
| 2005/0157415 A1 | 7/2005 | Chiang | |
| 2005/0243455 A1 | 11/2005 | Annampedu | |
| 2007/0008643 A1 * | 1/2007 | Brady et al. | 360/75 |
| 2007/0064847 A1 | 3/2007 | Gaedke | |
| 2007/0071152 A1 | 3/2007 | Chen et al. | |
| 2007/0103805 A1 | 5/2007 | Hayashi | |
| 2007/0104300 A1 | 5/2007 | Esumi et al. | |
| 2007/0139805 A1 * | 6/2007 | Mead | 360/51 |
| 2007/0183073 A1 | 8/2007 | Sutardja et al. | |
| 2007/0230015 A1 | 10/2007 | Yamashita | |
| 2007/0247736 A1 * | 10/2007 | Sai et al. | 360/51 |
| 2007/0263311 A1 | 11/2007 | Smith | |
| 2007/0280059 A1 | 12/2007 | Cheng et al. | |
| 2008/0019031 A1 * | 1/2008 | Chu et al. | 360/69 |
| 2008/0056403 A1 | 3/2008 | Wilson | |
| 2008/0080082 A1 | 4/2008 | Erden et al. | |
| 2008/0212715 A1 | 9/2008 | Chang | |
| 2008/0266693 A1 | 10/2008 | Bliss et al. | |
| 2008/0292040 A1 * | 11/2008 | Menolfi et al. | 375/376 |
| 2009/0002862 A1 | 1/2009 | Park | |
| 2009/0142620 A1 | 6/2009 | Yamamoto et al. | |
| 2009/0245448 A1 | 10/2009 | Ran et al. | |
| 2009/0274247 A1 | 11/2009 | Galbraith et al. | |
| 2010/0118426 A1 * | 5/2010 | Vikramaditya et al. | 360/51 |

OTHER PUBLICATIONS

U.S. Appl. No. 12/838,601, filed Aug. 19, 2010, Wilson, Ross.
U.S. Appl. No. 12/851,475, filed Aug. 5, 2010, Annampedu, Viswanath.
U.S. Appl. No. 12/887,327, filed Sep. 21, 2010, Llu et al.
U.S. Appl. No. 12/894,221, filed Sep. 30, 2010, Yang et al.
U.S. Appl. No. 12/946,048, filed Nov. 15, 2010, Yang et al.
U.S. Appl. No. 12/947,962, filed Nov. 17, 2010, Liu et al.
U.S. Appl. No. 12/946,033, filed Nov. 15, 2010, Yang et al.
U.S. Appl. No. 12/955,789, filed Nov. 29, 2010, Annampedu et al.
U.S. Appl. No. 12/955,821, filed Nov. 29, 2010, Annampedu et al.
U.S. Appl. No. 12/972,904, filed Dec. 20, 2010, Viswanath Annampedu.
U.S. Appl. No. 13/100,021, filed May 3, 2011, Xia, Haitao et.al.
U.S. Appl. No. 13/113,210, filed May 23, 2011, Zhang, Xun et.al.
U.S. Appl. No. 13/014,754, filed Jan. 27, 2011, Viswanath Annampedu.
U.S. Appl. No. 13/009,067, filed Jan. 19, 2011, Zhang, Xun et.al.
U.S. Appl. No. 13/050,048, filed Mar. 17, 2011, Xia, Haitao et.al.
U.S. Appl. No. 13/096,873, filed Apr. 28, 2011, Wilson, Ross S.
U.S. Appl. No. 13/173,088, filed Jun. 30, 2011, Grundvig, et al.
U.S. Appl. No. 13/186,267, filed Jul. 19, 2011, Xia, Haitao et al.
U.S. Appl. No. 13/242,983, filed Sep. 23, 2011, Grundvig, Jeffery P.

(56) References Cited

OTHER PUBLICATIONS

Annampedu, V. et al, "Adaptive Algorithms for Asynchronous Detection of Coded Servo Signals Based on Interpolation", IEEE Transactions on Magnetics, vol. 41, No. 10, Oct. 2005.

Aziz and Annampedu, "Asynchronous Maximum Likelihood (ML) Detection of Servo repeatable Run Out (RRO) Data" Magnetics Conf. IEEE International May 2006.

Aziz et al "Interpolation Based Maximum-Likelihood(ML) Detection of Asynchronous Servo Repeatable Run Out (RRO) Data", Digest, IEEE Intl Magnetics Conf. vol. 42, No. 10 Oct. 2006.

Kryder, M. et al "Heat Assisted Magnetic Recording" Proc. IEEE, vol. 96, No. 11, p. 1810, Nov. 2008.

Weller et al "Thermal Limits in Ultrahigh-density Magnetic Recording" IEEE Trans. Magn. vol. 35, No. 6, p. 4423, Nov. 1999.

* cited by examiner

SYSTEMS AND METHODS FOR CONTROLLED WEDGE SPACING IN A STORAGE DEVICE

BACKGROUND OF THE INVENTION

The present inventions are related to systems and methods for storing and accessing data to/from a storage medium.

A typical storage device includes a magnetic storage medium storing information that is magnetically represented on the storage medium. A head is disposed in relation to the storage medium that senses the magnetically represented information and provides an electrical signal corresponding to the magnetically represented information. This electrical signal is ultimately passed to a data detection circuit that performs one or more data detection processes in order to recover the information originally written to the storage medium. The information maintained on the storage medium typically includes both user data and synchronization data. The user data may be considered a random pattern, while the synchronization data is generally a defined pattern that may be used to synchronize to the phase of the data on the storage medium, and to set an appropriate gain to be applied to data retrieved from the storage medium. Data transfer systems often use a similar approach of transferring data that transfers what may be considered random regions of user data interspersed with synchronization data. Again, the synchronization data is generally a defined pattern that may be used to synchronize to the phase of the data on the storage medium, and to set an appropriate gain to be applied to data retrieved from the storage medium. It is common to utilize phase lock loops to synchronize to the synchronization data. Such an approach is generally effective, but can require a pattern of substantial length to properly process. Such pattern length wastes space on a storage medium and/or reduces transmission bandwidth.

Hence, for at least the aforementioned reasons, there exists a need in the art for advanced systems and methods for data processing.

BRIEF SUMMARY OF THE INVENTION

The present inventions are related to systems and methods for storing and accessing data to/from a storage medium.

Various embodiments of the present invention provide clock generation systems that include, a first clock multiplier circuit, a second clock multiplier circuit, a modulus accumulator circuit, and a data clock phase control circuit. The first clock multiplier circuit is operable to multiply a reference clock by a first multiplier to yield a first domain clock, and the second clock multiplier circuit is operable to multiply the reference clock by a second multiplier to yield a second domain clock. The modulus accumulator circuit is operable to yield a value indicating a fractional amount of the second domain clock that an edge of the second domain clock is offset from a trigger signal. The data clock phase control circuit is operable to phase shift the second domain clock by a phase amount corresponding to the fractional amount. In some instances of the aforementioned embodiments, the system is implemented as part of a storage device. In some cases, such a storage device is a hard disk drive. In one or more instances of the aforementioned embodiments, the system is implemented as an integrated circuit.

In some instances of the aforementioned embodiments, the system further includes a storage medium including a servo wedge and a user data region. In such instances, the first domain clock corresponds to a frequency of data in the servo wedge, and the second domain clock corresponds to a frequency of data in the user data region. In some cases, the servo wedge includes a sector address mark, and the trigger signal is asserted based at least in part on identification of the sector address mark.

In some instances of the aforementioned embodiments, the trigger signal is asserted synchronous to the first domain clock. In some instances of the aforementioned embodiments, the system further comprises a rounding and scaling circuit. The rounding and scaling circuit is operable to modify the value indicating the fractional amount to conform to a step size implementable by the data clock phase control circuit to yield the phase amount corresponding to the fractional amount. In various instances of the aforementioned embodiments, the phase amount is a first phase amount, and the data clock phase control circuit is operable to phase shift the second domain clock by a second phase amount and subsequently to phase shift the second domain clock by a third phase amount. The combination of the second phase amount and the third phase amount yields the first phase amount.

Other embodiments of the present invention provide methods for multi-domain clock generation that includes: receiving a trigger signal; based at least in part on the trigger signal, calculating a frequency error based on a difference between an expected count and an actual count; multiplying a reference clock by a first multiplier and an error percentage derived from the frequency error to yield a first domain clock; multiplying the reference clock by a second multiplier and the error percentage to yield a second domain clock; determining a fractional amount of the second domain clock that an edge of the second domain clock is offset from the trigger signal; and phase shifting the second domain clock by a phase amount corresponding to the fractional amount.

In some instances of the aforementioned embodiments, the method further includes accessing data from a storage medium. In such instances, the storage medium includes a servo wedge and a user data region, the first domain clock corresponds to a frequency of data in the servo wedge, and the second domain clock corresponds to a frequency of data in the user data region. The trigger signal is received based upon data accessed from the servo wedge. In some cases, the servo wedge includes a sector address mark, and the trigger signal is asserted based at least in part on identification of the sector address mark. In particular cases, the trigger signal is received synchronous to the first domain clock.

In some instances of the aforementioned embodiments, the method further includes modifying the fractional amount to conform to a step size implementable by the a data clock phase control circuit applying the phase shift to yield the phase amount corresponding to the fractional amount. In various instances, the phase amount is a first phase amount, and a data clock phase control circuit performing the phase shift is operable to phase shift the second domain clock by a second phase amount and subsequently to phase shift the second domain clock by a third phase amount. The combination of the second phase amount and the third phase amount yields the first phase amount.

Yet other embodiments of the present invention provide data storage devices that include: a storage medium including a servo wedge and a user data region, a read head disposed in relation to the storage medium and operable to sense information from the storage medium, and a read channel circuit. The read channel circuit includes: a first clock multiplier circuit, a second clock multiplier circuit, a modulus accumulator circuit, and a data clock phase control circuit. The first clock multiplier circuit is operable to multiply a reference clock by a first multiplier to yield a first domain clock. The first domain clock corresponds to a frequency of the information from the servo wedge. The second clock multiplier circuit is operable to multiply the reference clock by a second multiplier to yield a second domain clock. The second domain clock corresponds to a frequency of the information from the user data region. The modulus accumulator circuit is operable to yield a value indicating a fractional amount of the second domain clock that an edge of the second domain clock is offset from a trigger signal. The data clock phase control circuit operable to phase shift the second domain clock by a phase amount corresponding to the fractional amount.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for storing and accessing data to/from a storage medium.

Various embodiments of the present invention provide data processing circuits that include fractional data wedge spacing circuitry. Such data processing circuits may include disk lock clock circuitry operable to lock the clock used for processing data in a user data region with a clock used for processing data in a servo wedge (i.e., locking to the rotational speed of a disk medium). As used herein, the phrases "servo data sector" or "servo wedge" are used in their broadest sense to mean a region of a storage medium that includes synchronization information. Also, as used herein, the phrase "user data region" is used in its broadest sense to mean a region disposed in relation to one or more servo wedges that may be written or read. A once per clock fractional phase alignment is performed to fractionally offset the clock used for processing data in a user data region such that the clock is at least initially placed in a known phase relationship with a clock used for processing data from a servo wedge. Said another way, such fractional phase alignment allows for a clock that is usable in both a servo clock domain and the user data clock domain even though the clock used in the servo data region and the clock used in the user data region may be arbitrarily programmed to operate at different frequencies. In some cases, the clock architecture is designed with a knowledge of an exact fractional number of period of a data clock which are desired to fit in one servo wedge to servo wedge interval.

Figure 1A:
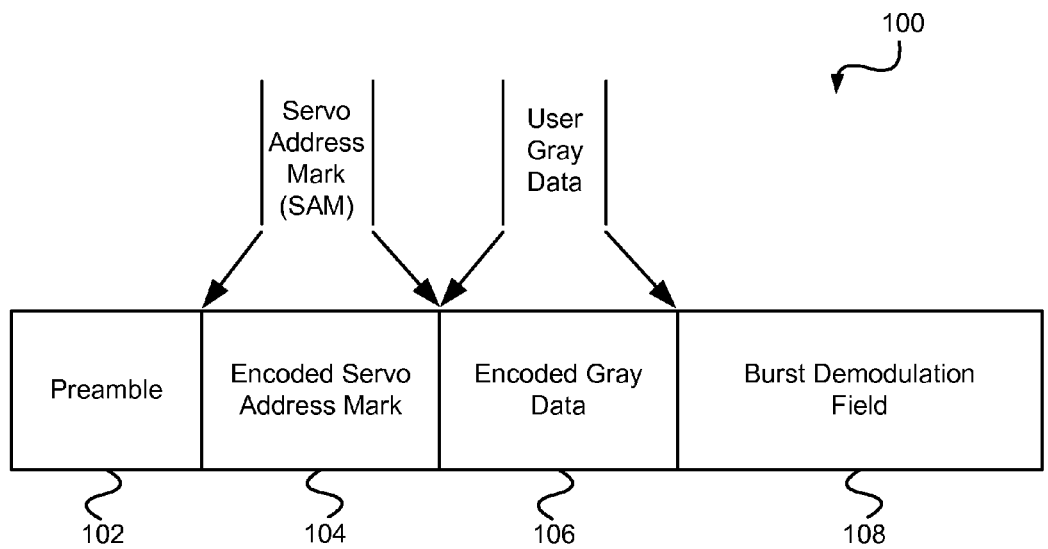
FIGS. 1a, 1b and 1c show an existing storage medium along with stored information.
Figure 1B:
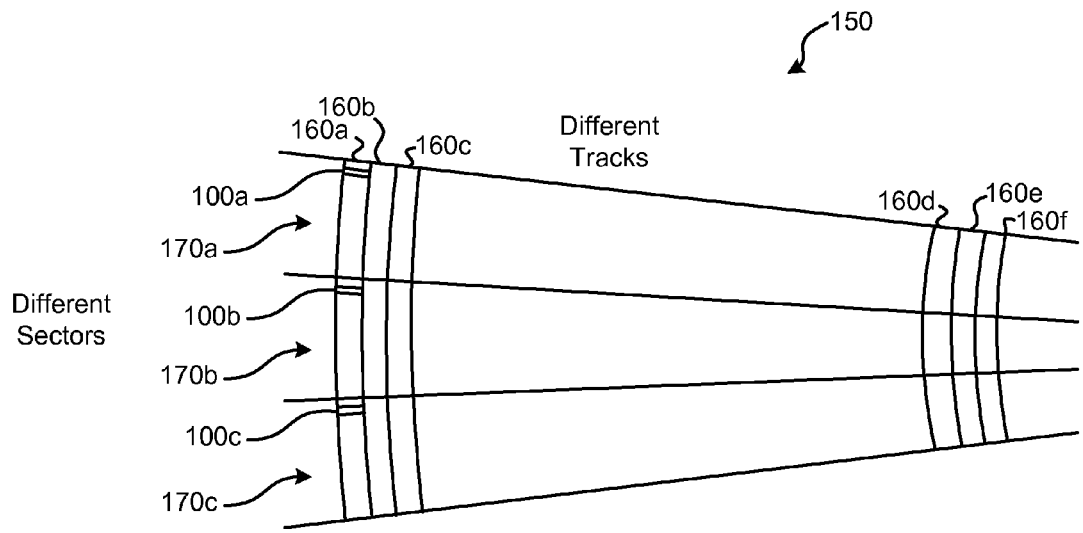

Turning to FIG. 1a, an example of synchronization information from an example servo wedge is depicted and is generally referred to herein as servo wedge 100. As shown, servo wedge 100 may include a preamble pattern 102 which allows the system to recover the timing and gain of the written servo data. Preamble 102 may be used to generate a clock at a phase and frequency useful for processing data from servo wedge 100 as is known in the art. Preamble pattern 102 is typically followed by a servo address mark (SAM) 104 which is the same for all servo wedges. SAM 104 is then followed by encoded servo Gray data 106, and Gray data 106 is followed by one or more burst demodulation fields 108. Gray data 106 may represent the track number/cylinder information and provides coarse positioning information for a read head traversing a magnetic storage medium. Burst demodulation field 108 provides fine positioning information for the read head traversing a magnetic storage medium. Turning to FIG. 1b, the aforementioned servo wedge 100 is shown incorporated as part of data sectors 170 distributed across a number of tracks 160 that extend in a radial pattern around a magnetic storage medium 150. Sectors 170 include both servo wedges and intervening user data regions.

In an ideal case, a read/write head assembly traverses an individual track 160 over alternating servo wedges 100 and intervening user data regions. As the read/write head assembly traverses the servo wedges 100, a SAMFOUND signal is generated providing an indication of the location of the read/write head assembly in relation to magnetic storage medium 150. When a SAMFOUND signal is generated, the time interval from the last SAMFOUND signal is used to determine whether a disk lock clock is synchronized to the placement of servo wedges 100 on storage medium 150. Where the disk lock clock is not properly locked, it is increased or decreased by an error amount indicated by the difference between the expected timing between consecutive SAMFOUND signals and the actual timing. This clock adjustment is performed once for each servo wedge 100.

Figure 1C:
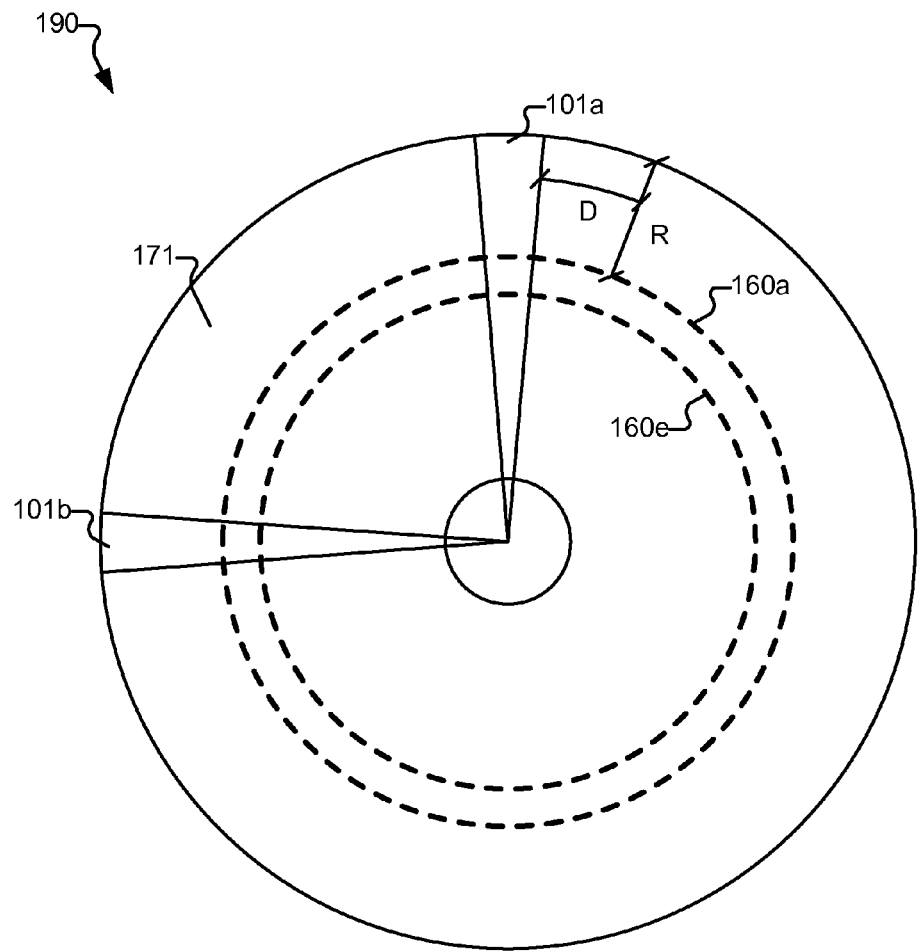

Turning to FIG. 1c, a storage medium 190 is shown with two example tracks 160a, 160e indicated as dashed lines. The tracks are segregated by servo data written within wedges 101a, 101b. These wedges include synchronization data similar to that discussed above in relation to example servo wedge 100. The synchronization data is used for control and synchronization of a read/write head assembly over a desired location on storage medium 190. As discussed above in relation to FIG. 1a, the servo data generally includes a preamble pattern 102 followed by a sector address mark 104 (SAM). Sector address mark 104 is followed by a Gray code 106, and Gray code 106 is followed by burst information 108. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 108. Between the wedges 101a and 101b, a user data region 171 is provided.

In operation, storage medium 190 is rotated in relation to a sensor (e.g., a read/write head assembly (not shown)) that senses information from storage medium 190. In a read operation, the sensor would sense servo data from wedge 100*b* (i.e., during a servo data period) followed by user data from a user data region between wedge 101*b* and wedge 101*a* (i.e., during a user data period) and then servo data from wedge 101*a*. In a write operation, the sensor would sense servo data from wedge 101*b* then write data to the user data region between wedge 101*b* and wedge 101*a*. Then, the sensor would be switched to sense a remaining portion of the user data region followed by the servo data from wedge 101*a*.

Figure 2:
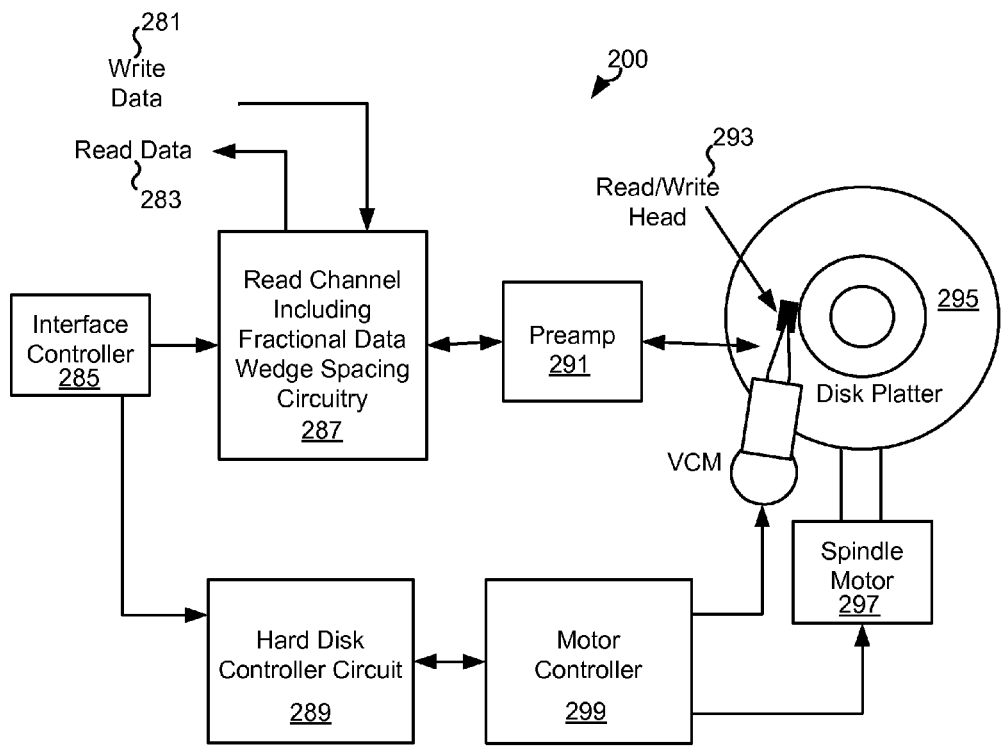
FIG. 2 depicts a storage device including a read channel circuit having fractional data wedge spacing circuitry in accordance with some embodiments of the present invention.

Turning to FIG. 2, a storage system 200 including a read channel circuit 287 having fractional data wedge spacing circuitry is shown in accordance with some embodiments of the present invention. Storage system 200 may be, for example, a hard disk drive. Storage system 200 also includes a preamplifier 291, an interface controller 285, a hard disk controller 289, a motor controller 299, a spindle motor 297, a disk platter 295, and a read/write head 293. Interface controller 285 controls addressing and timing of data to/from disk platter 295. The data on disk platter 295 consists of groups of magnetic signals that may be detected by read/write head assembly 293 when the assembly is properly positioned over disk platter 295. In one embodiment, disk platter 295 includes magnetic signals recorded in accordance with either a longitudinal or a perpendicular recording scheme.

Figure 4:
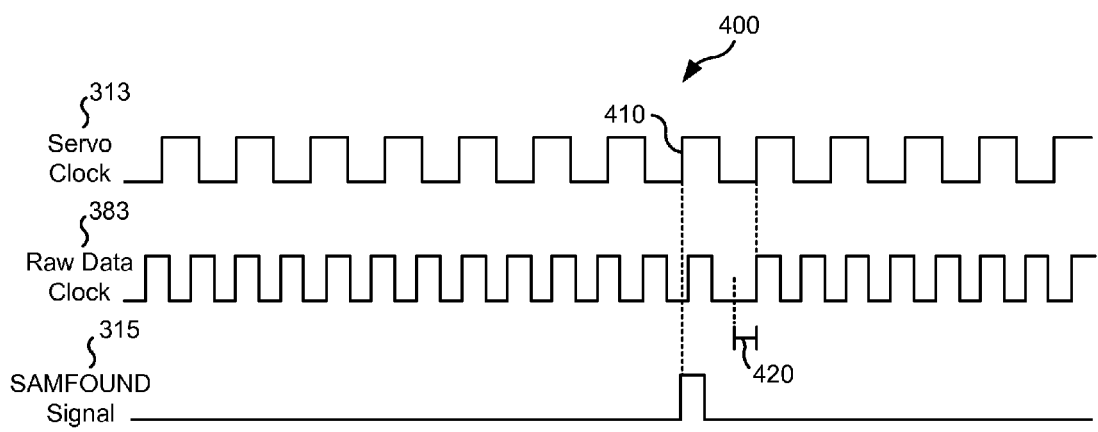
FIG. 4 is a timing diagram showing an example operation of the fractional data wedge spacing circuit of FIG. 3.

In a typical read operation, read/write head assembly 293 is accurately positioned by motor controller 299 over a desired data track on disk platter 295. Motor controller 299 both positions read/write head assembly 293 in relation to disk platter 295 and drives spindle motor 297 by moving read/write head assembly to the proper data track on disk platter 295 under the direction of hard disk controller 289. Spindle motor 297 spins disk platter 295 at a determined spin rate (RPMs). Once read/write head assembly 293 is positioned adjacent the proper data track, magnetic signals representing data on disk platter 295 are sensed by read/write head assembly 293 as disk platter 295 is rotated by spindle motor 297. The sensed magnetic signals are provided as a continuous, minute analog signal representative of the magnetic data on disk platter 295. This minute analog signal is transferred from read/write head assembly 293 to read channel circuit 287 via preamplifier 291. Preamplifier 291 is operable to amplify the minute analog signals accessed from disk platter 295. In turn, read channel circuit 287 decodes and digitizes the received analog signal to recreate the information originally written to disk platter 295. This data is provided as read data 283 to a receiving circuit. As part of decoding the received information, read channel circuit 287 performs a data detection and synchronization process using a data processing circuit with reduced complexity timing loops. Such a data processing circuit may include fractional data wedge spacing circuitry similar to that discussed below in relation to FIG. 3, and/or may operate consistent with the method discussed below in relation to FIG. 4. A write operation is substantially the opposite of the preceding read operation with write data 281 being provided to read channel circuit 287. This data is then encoded and written to disk platter 295.

It should be noted that storage system 200 may be integrated into a larger storage system such as, for example, a RAID (redundant array of inexpensive disks or redundant array of independent disks) based storage system. It should also be noted that various functions or blocks of storage system 200 may be implemented in either software or firmware, while other functions or blocks are implemented in hardware.

Figure 3:
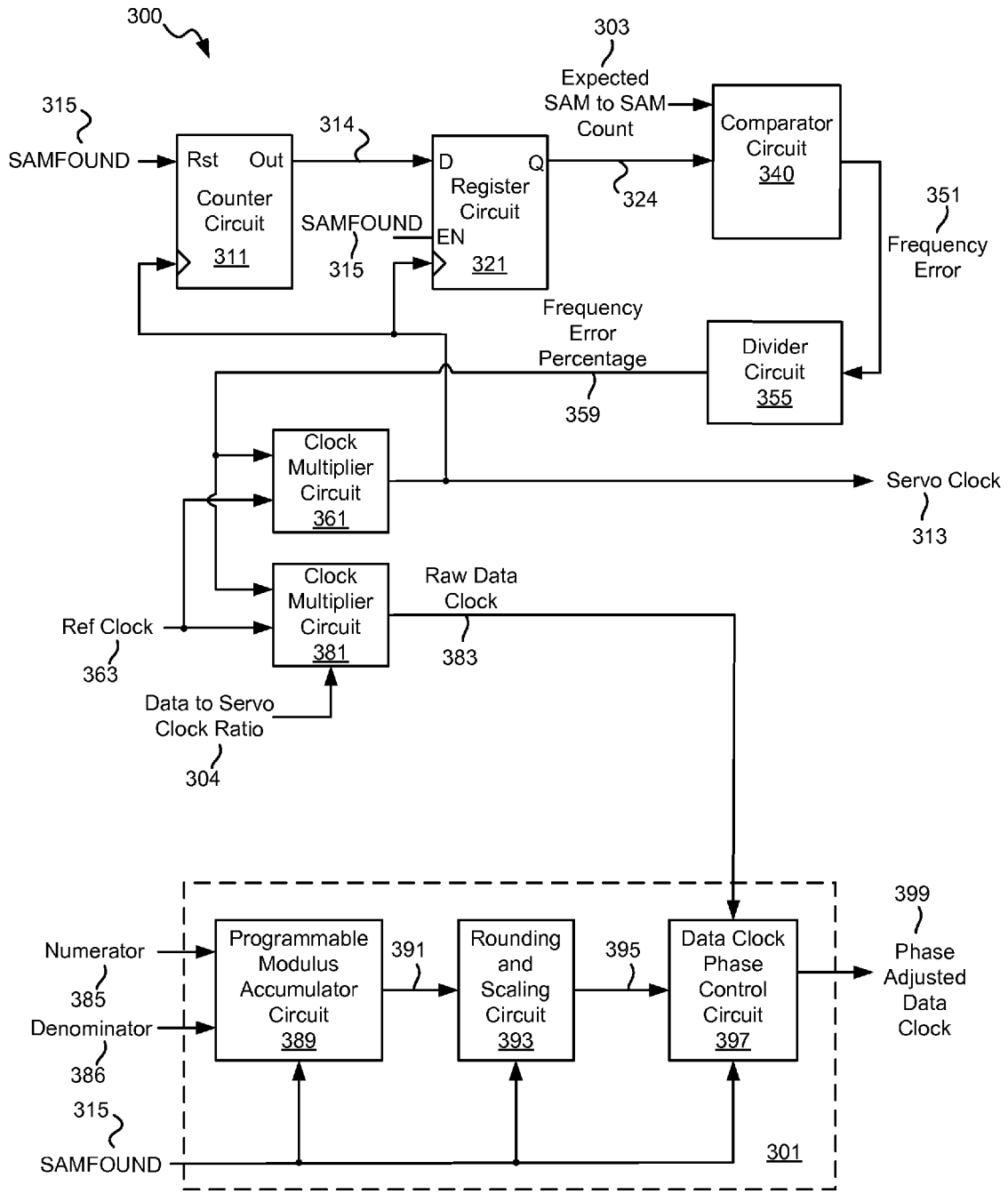
FIG. 3 shows a fractional data wedge spacing circuit in accordance with various embodiments of the present invention.

FIG. 3 shows a fractional data wedge spacing circuit 300 in accordance with various embodiments of the present invention. Fractional data wedge spacing circuit 300 includes a counter circuit 311 that is incremented on each rising edge of a servo clock 313, and is reset each time a SAMFOUND signal 315 is asserted. As suggested above, SAMFOUND signal 315 is asserted whenever a servo address mark 104 is identified in a servo wedge 100. In addition, each time SAMFOUND signal 315 is asserted, a count value 314 from counter circuit 311 is stored to a register circuit 321. Register circuit 321 provides count value 314 as a count output 324 to a comparator circuit 340.

The distance between successive assertions of SAMFOUND signal 315 is known and may be expressed as a number of clock cycles. This known number of clock cycles is referred to as an expected SAM to SAM count 303. Expected SAM to SAM count 303 is provided to comparator circuit 340 that is operable to determine a difference between expected SAM to SAM count 303 and count output 324, and to provide the difference as frequency error 351. Said another way, any difference between expected SAM to SAM count 303 and the actual number of clock cycles between successive assertions of SAMFOUND signal 315 is due to a frequency error.

Frequency error 351 is provided to a divider circuit 355 that divides frequency error 351 by a number corresponding to expected SAM to SAM count 303 in accordance with the following equation to yield a frequency error percentage 359:

$$\text{Frequency Error Percentage } 359 = \frac{\text{Frequency Error } 351}{\text{Expected } SAM \text{ to } SAM \text{ Count } 303}.$$

A clock multiplier circuit 361 multiplies a reference clock 363 by a value corresponding to frequency error percentage 359 to yield servo clock 313 in accordance with the following equation:

Servo Clock 313=Servo Clock Multiplier*[Reference Clock 363*(1+Frequency Error Percentage 359)].

Reference clock 363 is phase and frequency aligned with a clock generated using information from servo wedges. The servo clock multiplier is a defined multiple of the frequency of reference clock 363 to yield servo clock 313. In some cases, the servo clock multiplier may be variable through programming or may be fixed. For example, where a 1.02 GHz clock is desired for servo clock 313 and reference clock 363 is a 30 MHz clock, then the servo clock multiplier is thirty-four (34) (i.e., 1.02 GHz/30 MHz). It should be noted that the servo clock multiplier does not need to be an integer value, but may include a fractional component as well. Where fractional values are included, the size of the registers in clock multiplier circuit 361 are increased to accommodate the bits representing the fractional portion.

A clock multiplier circuit 381 multiplies reference clock 363 by a value corresponding to frequency error percentage 359 and by a data to servo clock ratio 304 to yield a raw data clock 383. Data to servo clock ratio 304 is an expected ratio between the frequency of data in the data region between successive servo wedges and the frequency of information in the servo data regions represented by the following equation:

$$\text{Data to Servo Clock Ratio } 304 = \frac{\text{Frequency of Data Region}}{\text{Frequency of } Sevo \text{ Data Sector}}.$$

The following equation yields raw data clock 383:

Raw Data Clock 383=Data Clock Multiplier*[Reference Clock 363*(1+Frequency Error Percentage 359)*Data to Servo Clock Ratio 304].

As servo clock 313 and raw data clock 383 are generated from reference clock 363, disk clock lock is achieved. The data clock multiplier is a defined multiple of the frequency of reference clock 363 to yield raw data clock 383. For example, where a 1.38 GHz clock is desired for raw data clock 383 and reference clock 363 is a 30 MHz clock, then the data clock multiplier is forty-six (46) (i.e., 1.38 GHz/30 MHz). It should be noted that the data clock multiplier does not need to be an integer value, but may include a fractional component as well. Where fractional values are included, the size of the registers in clock multiplier circuit 381 are increased to accommodate the bits representing the fractional portion.

Such disk clock locking locks the frequency of raw data clock 383 to a frequency proportional to the frequency of servo clock 313. Such frequency association between an internal read channel clock and the spinning disk so that among other things user data regions extending between successive servo wedges are written with less frequency variation. This reduction in frequency variation reduces the amount of range that a timing recovery loop circuit governing user data writing must operate.

The previously described portion of data wedge spacing circuit 300 provides servo clock 313 corresponding to the frequency of information in the servo wedges and raw data clock 383 corresponding to the frequency of data stored to user data regions intervening between successive servo wedges. Both servo clock 313 and raw data clock 383 are derived from the same reference clock 363 and are adjusted by the same frequency error percentage 359. However, since raw data clock 383 and servo clock 313 can run at different frequencies even if a phase lock is achieved for the servo wedges, raw data clock 383 may still drift in phase over time as it beats against servo clock 313 from one revolution of the disk to the next revolution of the disk. The circuitry of fractional data wedge spacing circuit 300 described below is operable to achieve phase lock at a defined point in both the domain of servo clock 313 and raw data clock 383 even though the two clocks may be programmed to have arbitrarily different frequencies. In some embodiments of the present invention, a predicted and controlled phase adjustment is made to raw data clock 383 once per servo wedge that is not based on the timing recovery loop read back waveform, but rather on the system knowledge of the frequency ratio between raw data clock 383 and servo clock 313.

A phase adjustment circuit 301 assures that the first edge of a phase adjusted data clock 399 is phase aligned with a corresponding edge of servo clock 313. Phase adjustment circuit 301 is operable to apply a fractional phase offset (i.e., sub-period of servo clock 313) to raw data clock 383 and thereby align phase adjusted data clock 399 with servo clock 313. Of note, raw data clock 383 is frequency matched to servo clock 313 by clock multiplier circuit 381 (i.e., matched to a frequency proportional to that of servo clock 313). Thus, phase adjusted data clock 399 is both phase and frequency aligned at the end of a servo wedge and the beginning of a user data region.

Phase adjustment circuit 301 includes a programmable modulus accumulator circuit 389 that receives numerator value 385 and denominator value 386. Denominator value 386 is set equal to the servo clock multiplier used by multiplier circuit 361. Numerator value 385 is set in accordance with the following equation:

$$\text{Numerator Value 385} = \text{remainder}\left[\text{Distance} * \frac{\text{Data Clock Multiplier}}{\text{Servo Clock Multiplier}}\right],$$

where the Distance is the number of periods of servo clock 313 from one servo wedge to the following servo wedge.

Programmable modulus accumulator circuit 389 calculates the number of periods of raw data clock 383 mod denominator value 386 to yield a modulus output 391. Thus, for example, where the denominator value is eight and the count of the number of raw data clock 383 periods is nine, modulus output is one plus one eighth. Modulus output 391 is updated each time SAMFOUND 315 is asserted. In one embodiment of the present invention, programmable modulus accumulator circuit 389 operates in accordance with the following pseudo-code:

Temporary Value = Old Accumulator + Numerator Value 385;
If (SAMFOUND 315 is asserted)
{
   Old Accumulator = Modulus Output 391;
   If (Temporary Value < Denominator Value 386)
   {
      Modulus Output 391 = Temporary Value
   }
   Else
   {
      Modulus Output 391 = Temporary Value – Denominator Value 386
   }
}

Of note, as with the above mentioned servo clock multiplier and data clock multiplier, denominator value 386 does not need to be an integer value, but may include a fractional component as well. In such cases, the size of the accumulators is expanded to accommodate the fractional bits.

As suggested in the preceding pseudo-code, modulus output 391 is updated upon assertion of SAMFOUND signal 315. Modulus output 391 is provided to a rounding and scaling circuit 393 that rounds to modulus output to a step size that is achievable by a data clock phase control circuit 397. Rounding and scaling circuit 393 provides the modified modulus output 391 as a modified output 395. Data clock phase control circuit 397 applies a phase shift to raw data clock 383 that corresponds to modified output 395 to yield a phase adjusted data clock 399. Data clock phase control circuit 397 may be any circuit known in the art that is capable of applying a phase shift to a clock signal to yield a phase shifted clock signal as an output. Based upon the disclosure provided herein, one of ordinary skill in the art will recognize a variety of phase shift circuits that may be used in relation to different embodiments of the present invention. In the case where SAMFOUND signal 315 is synchronous to servo clock 313, the first rising edge of phase adjusted data clock 399 after assertion of SAMFOUND signal 315 is phase aligned with servo clock 313. In some cases, the phase alignment is exact, while in other cases there is a known delay between the rising edge of servo clock 313 and phase adjusted data clock 399 which, because it is known, can be compensated. In other embodiments, a trigger other than SAMFOUND signal 315 that is also synchronized to servo clock 313 may be used. In either case, the initial edge of phase adjusted data clock 399 after assertion of the trigger is forced into a defined phase alignment with servo clock 397 by data clock phase control signal 397.

As just one advantage that may be achieved through use of circuits similar to fractional data wedge spacing circuit 300, an ability to control the phase of raw data clock 383 may allow for improved format efficiency (reduced amount of formatting bits) by eliminating some uncertainty in the relative position of the servo wedges and intervening data regions. As another example of advantage that may be achieved through use of circuits similar to fractional data wedge spacing circuit 300, a benefit to shingled recording applications may be achieved if the clock phase for adjacent data tracks is always known and controlled. As another example of advantage that may be achieved through use of circuits similar to fractional data wedge spacing circuit 300, various embodiments of the present invention may be used in relation to Bit Patterned Media where there may be a need to accommodate fractional data periods between servo wedges while achieving a phase lock to these data islands. Based upon the disclosure provided herein, one of ordinary skill in the art will recognize a variety of other advantages either in addition to or in place of the above mentioned advantages that may be achieved through use of circuits similar to those discussed in relation to FIG. 3.

As an example of the operation of fractional data wedge spacing circuit 300, servo clock multiplier is thirty-four (34) and data clock multiplier is forty-six (46). Clock multiplier circuit 361 and clock multiplier circuit 381 are used to lock the phase and frequency of servo clock 313 to force exactly 10,000 periods of servo clock 313 per SAM to SAM period (i.e., expected SAM to SAM count 303 is 10,000). This disk lock forces the interval in order to avoid phase drift of raw data clock 383 relative to the servo wedges on either side of a user data region. To do this, raw data clock 383 is has exactly 13,529 and $^{14}/_{34}$ periods per SAM to SAM period (i.e., 10,000*46/34=13,529.4118).

This can be achieved by performing a +$^{14}/_{34}$ths phase adjustment to raw data clock 383 to yield phase adjusted data clock 399 each time SAMFOUND signal 315 is asserted. Using phase adjusted data clock 399, a data processing circuit included as part of a read channel circuit can use a data bit counter that wraps every 13529 clock periods to monitor the current data clock period position relative to the preceding servo wedge.

Data clock phase control circuit 397 is typically designed to have a resolution aligned to a power of two (i.e., 1, 2, 4, 8, 16, 64, 128 . . . ). In an example embodiment, the resolution of data clock phase control circuit 397 is T/64 (i.e., phase adjusted data clock 399 may be adjusted in increments of $\frac{1}{64}$ of a period of raw data clock 383). In such a case, the $^{14}/_{34}$ths phase shift must be expressed in increments of nT/64. In this case, $^{14}/_{34}$ths is closest to 26T/64. Of note, in some cases, a simple digital circuit can be designed to keep track of the 14/34T adjustment which needs to be made on average for each servo wedges and the actual amount of phase adjustment applied to phase adjusted data clock 399 would be rounded from this value.

Following the aforementioned example through multiple successive servo wedges, the following table shows the progression of phase offsets applied at the end of each successive servo wedge:

| Servo Wedge Number | Modulus Output 391 | Modified Output 395 | Cumulative Data Clock Phase Adjustment Applied to Phase Adjusted Data Clock 399 |
|---|---|---|---|
| 1 | 14/34 | 26/64 | 26/64 |
| 2 | 28/34 | 53/64 | 53/64 |
| 3 | 8/34 (Wrapped Around) | 15/64 | 1 and 15/64 |
| 4 | 22/34 | 41/64 | 1 and 41/64 |
| 5 | 2/34 (Wrapped Around) | 4/64 | 2 and 4/64 |
| 6 | 16/34 | 30/64 | 2 and 30/64 |
| . . . | . . . | . . . | . . . |

By using such fractional locking, a phase lock can be achieved for phase adjusted data clock 399 and servo clock 313. The cost for this Turning to 4, a timing diagram 400 shows an example operation of fractional data wedge spacing circuit 300. Following timing diagram 400, raw data clock 383 and servo clock 313 are operating at different frequencies. When a sector address mark is found, SAMFOUND signal 315 is asserted. Upon assertion of SAMFOUND signal 315 synchronous to a clock edge 410 of servo clock 313, data clock phase control circuit 397 phase shifts phase adjusted data clock 399 by a phase amount 420. Phase amount 420 corresponds to an amount indicated by modified output 395.

Figure 5:
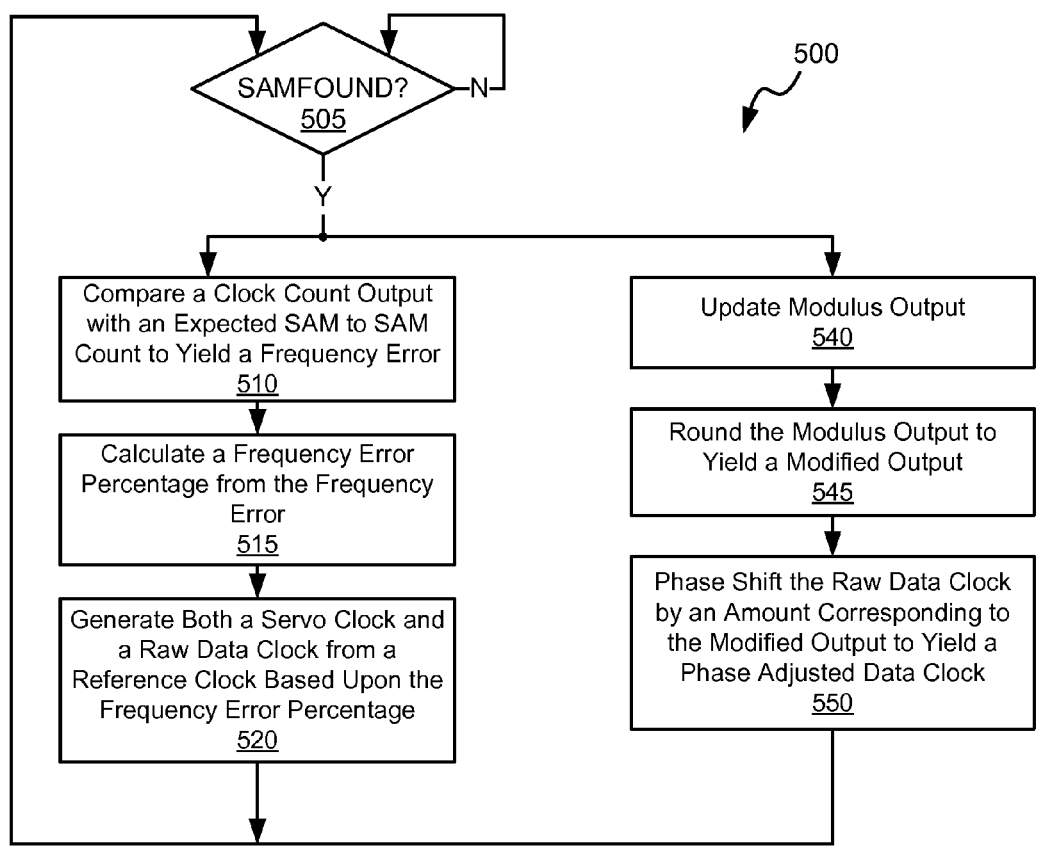
FIG. 5 is a flow diagram showing a method for fractional data wedge spacing in accordance with some embodiments of the present invention.

Turning to FIG. 5, a flow diagram 500 shows a method for fractional data wedge spacing in accordance with some embodiments of the present invention. Following flow diagram 500, is it determined whether a sector address mark has been identified (block 505). Any approach known in the art for identifying a sector address mark may be used. Where a sector address mark has been identified (block 505), a clock count output indicating the number of clocks occurring between servo wedges is compared with an expected SAM to SAM count to determine a frequency error (block 510). A frequency error percentage is calculated based upon the frequency error (block 515). The frequency error percentage may be calculated in accordance with the following equation:

$$\text{Frequency Error Percentage} = \frac{\text{Frequency Error 351}}{\text{Expected } SAM \text{ to } SAM \text{ Count}}.$$

Both a servo clock and a raw data clock are generated from a reference clock based upon the frequency error percentage (block 520). The servo clock may be generated by multiplying the reference clock by a value corresponding to the frequency error percentage as shown in the following equation:

Servo Clock=Servo Clock Multiplier*[Reference Clock*(1+Frequency Error Percentage)].

The reference clock is phase and frequency aligned with a clock generated using information from servo wedges. The servo clock multiplier is a defined multiple of the frequency of the reference clock that yields the servo clock. In some cases, the servo clock multiplier may be variable through programming or may be fixed. For example, where a 1.02 GHz clock is desired for servo clock 313 and reference clock 363 is a 30 MHz clock, then the servo clock multiplier is thirty-four (34) (i.e., 1.02 GHz/30 MHz). It should be noted that the servo clock multiplier does not need to be an integer value, but may include a fractional component as well.

The raw data clock may be generated by multiplying the reference clock by a value corresponding to the frequency error percentage and by a data to servo clock ratio. The data to servo clock ratio is an expected ratio between the frequency of data in the data region between successive servo wedges and the frequency of information in the servo data regions represented by the following equation:

$$\text{Data to Servo Clock Ratio} = \frac{\text{Frequency of Data Region}}{\text{Frequency of } Sevo \text{ Data Sector}}.$$

The following equation yields the raw data clock:

Raw Data Clock=Data Clock Multiplier*[Reference Clock*(1+Frequency Error Percentage)*Data to Servo Clock Ratio].

As both the servo clock and the raw data clock are generated from the same reference clock, disk clock lock is achieved.

In addition, a modulus output is updated (block 540). The modulus output indicates a fraction of a period of raw data clock that raw data clock is offset from the assertion of a sector address mark signal. The modulus output may be rounded to place it in the same step size as can be accommodated by a phase shift circuit (block 545). The rounded value is provided to a phase shift circuit as a modified output. The raw data clock is then phase shifted by an amount corresponding to the modified output to yield a phase adjusted data clock (block 550).

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A clock generation system, the clock generation system comprising:
    a first clock multiplier circuit operable to multiply a reference clock by a first multiplier to yield a first domain clock;
    a second clock multiplier circuit operable to multiply the reference clock by a second multiplier to yield a second domain clock;
    a modulus accumulator circuit operable to yield a value indicating a fractional amount of the second domain clock that an edge of the second domain clock is offset from a trigger signal;
    a data clock phase control circuit operable to phase shift the second domain clock by a phase amount corresponding to the fractional amount; and
    a rounding and scaling circuit operable to modify the value indicating the fractional amount to conform to a step size implementable by the data clock phase control circuit to yield the phase amount corresponding to the fractional amount.

2. The clock generation system of claim 1, wherein the system further comprises:
    a storage medium including a servo wedge and a user data region; and
    wherein the first domain clock corresponds to a frequency of data in the servo wedge, and the second domain clock corresponds to a frequency of data in the user data region.

3. The clock generation system of claim 2, wherein the servo wedge includes a sector address mark, and wherein the trigger signal is asserted based at least in part on identification of the sector address mark.

4. The clock generation system of claim 1, wherein the trigger signal is asserted synchronous to the first domain clock.

5. The clock generation system of claim 1, wherein the phase amount is a first phase amount, and wherein the data clock phase control circuit is operable to phase shift the second domain clock by a second phase amount and subsequently to phase shift the second domain clock by a third phase amount, and wherein a combination of the second phase amount and the third phase amount yields the first phase amount.

6. The clock generation circuit of claim 1, wherein the system is implemented as part of a storage device.

7. The clock generation circuit of claim 6, wherein the storage device is a hard disk drive.

8. The clock generation system of claim 1, wherein the system is implemented as an integrated circuit.

9. A method for multi-domain clock generation, the method comprising:
    receiving a trigger signal;
    based at least in part on the trigger signal, calculating a frequency error based on a difference between an expected count and an actual count;
    multiplying a reference clock by a first multiplier and an error percentage derived from the frequency error to yield a first domain clock;
    multiplying the reference clock by a second multiplier and the error percentage to yield a second domain clock;
    determining a fractional amount of the second domain clock that an edge of the second domain clock is offset from the trigger signal; and
    phase shifting the second domain clock by a phase amount corresponding to the fractional amount, wherein the phase amount is a first phase amount, and wherein a data clock phase control circuit performing the phase shift is operable to phase shift the second domain clock by a second phase amount and subsequently to phase shift the second domain clock by a third phase amount, and wherein a combination of the second phase amount and the third phase amount yields the first phase amount.

10. The method of claim 9, the method further comprising:
    accessing data from a storage medium, wherein the storage medium includes a servo wedge and a user data region, wherein the first domain clock corresponds to a frequency of data in the servo wedge, and wherein the second domain clock corresponds to a frequency of data in the user data region; and
    wherein the trigger signal is received based upon data accessed from the servo wedge.

11. The method of claim 10, wherein the servo wedge includes a sector address mark, and wherein the trigger signal is asserted based at least in part on identification of the sector address mark.

12. The method of claim 9, wherein the trigger signal is received synchronous to the first domain clock.

13. The method of claim 9, wherein the method further comprises:
    modifying the fractional amount to conform to a step size implementable by the a data clock phase control circuit applying the phase shift to yield the phase amount corresponding to the fractional amount.

14. A data storage device, the data storage device comprising:
    a storage medium including a servo wedge and a user data region;

a read head disposed in relation to the storage medium and operable to sense information from the storage medium;

a read channel circuit comprising:

a first clock multiplier circuit operable to multiply a reference clock by a first multiplier to yield a first domain clock, wherein the first domain clock corresponds to a frequency of the information from the servo wedge;

a second clock multiplier circuit operable to multiply the reference clock by a second multiplier to yield a second domain clock, wherein the second domain clock corresponds to a frequency of the information from the user data region;

a modulus accumulator circuit operable to yield a value indicating a fractional amount of the second domain clock that an edge of the second domain clock is offset from a trigger signal; and a data clock phase control circuit operable to phase shift the second domain clock by a first phase amount corresponding to the fractional amount, wherein the data clock phase control circuit is operable to phase shift the second domain clock by a second phase amount and subsequently to phase shift the second domain clock by a third phase amount, and wherein a combination of the second phase amount and the third phase amount yields the first phase amount.

15. The storage device of claim 14, wherein the servo wedge includes a sector address mark, and wherein the trigger signal is asserted based at least in part on identification of the sector address mark.

16. The storage device of claim 15, wherein the trigger signal is asserted synchronous to the first domain clock.

17. The storage device of claim 14, wherein the storage device further comprises:

a rounding and scaling circuit operable to modify the value indicating the fractional amount to conform to a step size implementable by the data clock phase control circuit to yield the phase amount corresponding to the fractional amount.

18. The storage device of claim 14, wherein the storage device is a hard disk drive.

19. A method for multi-domain clock generation, the method comprising:

receiving a trigger signal;

based at least in part on the trigger signal, calculating a frequency error based on a difference between an expected count and an actual count;

multiplying a reference clock by a first multiplier and an error percentage derived from the frequency error to yield a first domain clock;

multiplying the reference clock by a second multiplier and the error percentage to yield a second domain clock;

determining a fractional amount of the second domain clock that an edge of the second domain clock is offset from the trigger signal;

phase shifting the second domain clock by a phase amount corresponding to the fractional amount; and modifying the fractional amount to conform to a step size implementable by the a data clock phase control circuit applying the phase shift to yield the phase amount corresponding to the fractional amount.

20. The method of claim 19, the method further comprising:

accessing data from a storage medium, wherein the storage medium includes a servo wedge and a user data region, wherein the first domain clock corresponds to a frequency of data in the servo wedge, and wherein the second domain clock corresponds to a frequency of data in the user data region; and wherein the trigger signal is received based upon data accessed from the servo wedge.

* * * * *